(12) United States Patent
Shi et al.

(10) Patent No.: US 10,624,162 B2
(45) Date of Patent: Apr. 14, 2020

(54) IMPROVING THD FOR A DIRECT AC LED LIGHTING DEVICE

(71) Applicant: DIALOG SEMICONDUCTOR INC., Campbell, CA (US)

(72) Inventors: Nan Shi, Campbell, CA (US); Haiju Li, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 15/927,899

(22) Filed: Mar. 21, 2018

(65) Prior Publication Data

US 2019/0297695 A1 Sep. 26, 2019

(51) Int. Cl.
*H05B 33/08* (2006.01)
*H02M 1/12* (2006.01)
*H02M 1/42* (2007.01)

(52) U.S. Cl.
CPC .......... *H05B 33/0815* (2013.01); *H02M 1/12* (2013.01); *H02M 1/4208* (2013.01)

(58) Field of Classification Search
CPC ................ H05B 33/08; H05B 33/0815; H05B 33/0824; H05B 33/0842; H05B 33/083; H05B 33/089; H02M 1/12; H02M 1/42; H02M 1/4208
See application file for complete search history.

(56) References Cited

U.S. PATENT DOCUMENTS

| | | | |
|---|---|---|---|
| 9,307,612 B2 | 4/2016 | Jao et al. | |
| 2010/0148683 A1* | 6/2010 | Zimmermann | H05B 33/0818 315/224 |
| 2012/0081009 A1* | 4/2012 | Shteynberg | H05B 33/083 315/122 |
| 2012/0169417 A1* | 7/2012 | Sakai | H05B 33/0812 330/69 |
| 2017/0127486 A1 | 5/2017 | Kang et al. | |

FOREIGN PATENT DOCUMENTS

DE 102016103623 9/2016

OTHER PUBLICATIONS

Dayal et al., "A direct AC LED driver with high power factor without the use of passive components", Energy Conversion Congress and Exposition (ECCE), Sep. 15-20, 2012, pp. 4230-4234, 2012 IEEE, 10.1109/ECCE.2012.6342248, Raleigh, NC, USA.

* cited by examiner

*Primary Examiner* — Thai Pham
(74) *Attorney, Agent, or Firm* — Haynes and Boone, LLP

(57) ABSTRACT

A direct AC LED lighting device is provided with a variable current source and a controller. The controller controls the variable current source to conduct a THD compensation current while an LED string in the direct AC lighting device is not conducting to improve power factor and reduce the THD.

15 Claims, 4 Drawing Sheets

IMPROVING THD FOR A DIRECT AC LED LIGHTING DEVICE

TECHNICAL FIELD

This application relates to direct AC LED lighting devices, and more particularly to a direct AC LED lighting device with improved total harmonic distortion (THD).

BACKGROUND

The replacement of incandescent bulbs by light emitting diode (LED) lighting devices reduces energy consumption due to the high efficiency of LED devices as compared to incandescent bulbs. But an incandescent bulb may be directly driven by the AC mains whereas an LED device cannot. It is thus conventional for an LED device to include a switching power converter such as a flyback converter to provide a regulated DC current for driving the LED. This need for a switching power converter raises costs and thus diminishes a consumer's desire to switch to LED devices and instead continue to use incandescent bulbs, which contributes to global warming due to the increased greenhouse gas emissions from the resulting energy consumption.

To lower LED device costs, direct AC LED devices (which may also be denoted as direct AC LED bulbs) have been developed that obviate the need for a switching power converter. In a direct AC LED device, the AC mains voltage is rectified through a rectifier such as a bridge diode rectifier to produce a rectified AC input voltage. The LED in a direct AC LED device is directly driven by the rectified AC input voltage. Although no switching power converter is thus needed to convert the rectified AC input voltage into a regulated DC current/voltage, a direct AC LED device still needs a controller to control the LED power. In particular, the controller controls a current source in series with the LED. When the rectified AC input voltage (which may also be denoted as a post diode bridge voltage) rises above the threshold voltage for the LED, the controller switches on the current source so that the LED conducts a substantially constant current set by the current source. The resulting post diode bridge voltage and LED current waveforms are shown in FIG. 1. The post diode bridge voltage cycles high two times for every cycle of the AC mains voltage (not illustrated). When the post diode bridge voltage exceeds the LED threshold voltage, the LED current flows until the post diode bridge voltage falls below the LED threshold voltage again. The resulting pulsing of the LED current causes substantial total harmonic distortion (THD) and lowered power factor.

Accordingly, there is a need in the art for direct AC LED devices with improved THD and improved power factor.

SUMMARY

A direct AC LED lighting device is provided that includes a first variable current source that is switched off while an LED string conducts and controlled to conduct a THD compensation current that is proportional to a post diode bridge voltage while the LED string is not conducting. Both the LED string and the first variable current source couple to a power rail supplying the post diode bridge voltage. A diode bridge rectifies an AC mains voltage to produce the post diode bridge voltage. The direct AC LED lighting device may also include a second variable current source that is in series with the LED string. A controller controls both the first and second variable current sources so that an overall current sourced from the power supply rail is proportional to the post diode bridge voltage to achieve a high power factor and low THD.

These advantageous features may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

An improved direct AC LED lighting device is disclosed having lowered THD and increased power factor. To achieve lowered THD and increased power factor, the improved direct AC LED lighting device includes a variable current source that conducts when the LED string is switched off because the post diode bridge voltage is below the threshold voltage for the LED string. A controller controls the variable current source so that its current is proportional to the post diode bridge voltage. Since the current conducted by the direct AC lighting device has a profile that is proportional to the post diode bridge voltage profile, the total harmonic distortion is considerably reduced as compared to an operation without the variable current source. Moreover, the proportionality of the current conducted by the direct AC lighting device to the post diode bridge voltage leads to a high power factor as well.

To provide a better proportionality between the AC direct lighting device current and the post diode bridge voltage, the current source in series with the LED string may also be a variable current source. A current command from the controller that is commanding for a current proportional to the post diode bridge voltage may thus be applied to two variable current sources. In particular, a first variable current source connects from the power rail carrying the post diode bridge voltage and ground. The current conducted by the first variable current source thus bypasses the LED string so that it is the first variable current source that is active while the LED string is not conducting due to the post diode bridge voltage not exceeding the LED string's threshold voltage. When the post diode bridge voltage exceeds the threshold voltage, the controller switches off the first variable current source and controls a second variable current source that is in series with the LED string. This second variable current source thus functions analogously to a conventional constant current source for controlling the LED current as discussed with regard to FIG. 1. However, the controller varies the current conducted by the second variable current source to be proportional to the post diode bridge voltage. When the post diode bridge voltage falls below the threshold voltage, the controller switches on the first variable current source to produce a current proportional to the post diode bridge voltage and switches off the second variable current source. The first variable current source then remains on until the post diode bridge voltage again exceeds the threshold voltage, whereupon the control cycle is repeated.

Figure 2:
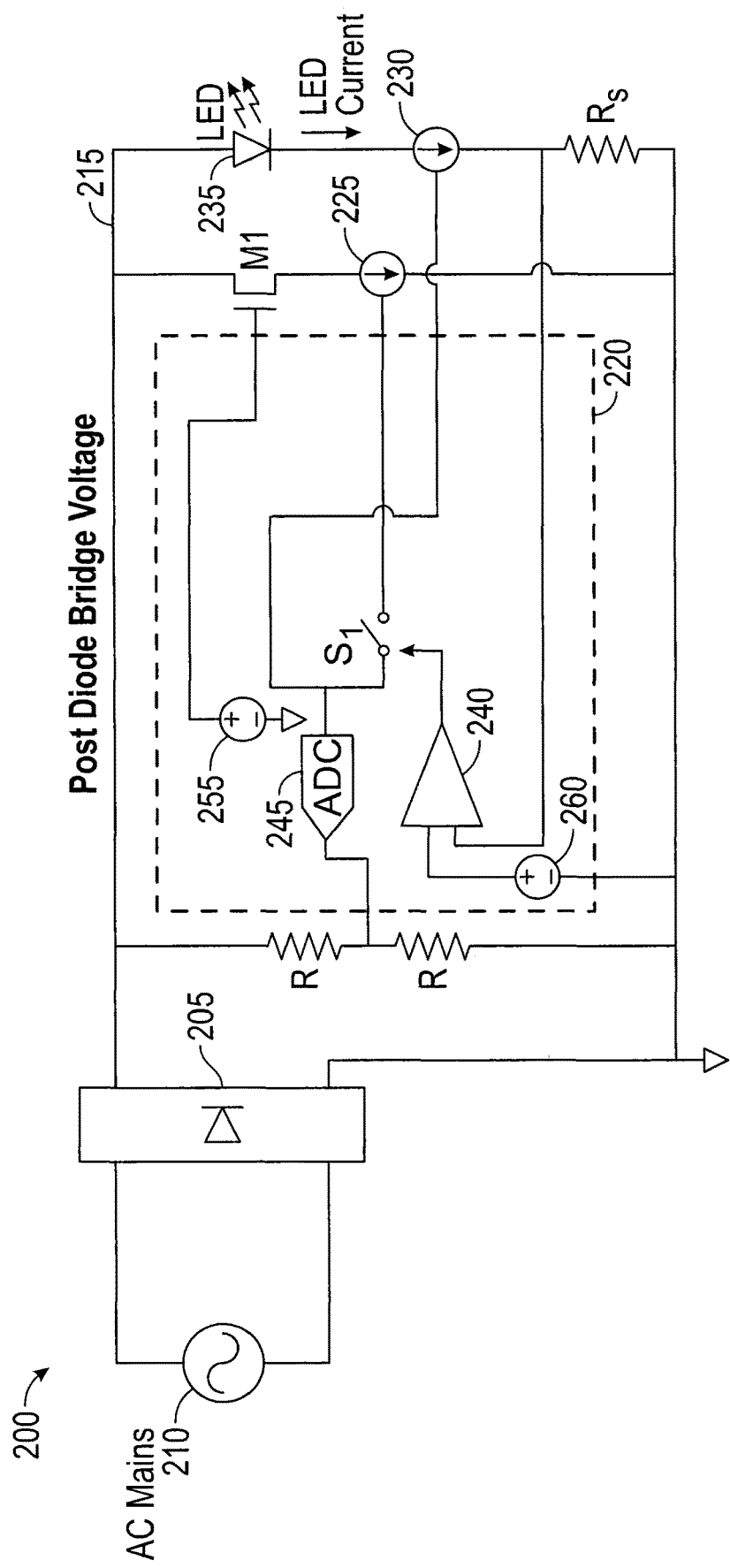
FIG. 2 illustrates a direct AC LED lighting device with digital control in accordance with an aspect of the disclosure.

The variable current sources and their control may be implemented in either analog or digital circuitry. A digital implementation will be discussed first followed by a discussion of an analog implementation. An example direct AC lighting device 200 with digital control is shown in FIG. 2. A diode bridge 205 rectifies an AC mains voltage from an AC mains 210 to produce a post diode bridge voltage carried on a power rail 215. A controller 220 controls a first variable current source 225 and a second variable current source 230 so that a current sourced from power rail 215 is proportional to the post diode bridge voltage carried on power rail 215. First variable current source 225 connects between power rail 215 and ground so as to bypass an LED string 235. In contrast, second variable current source 230 is in series with LED string 235 between power rail 215 and ground. Controller 220 may always drive current source 230 with a digitized command for controlling the LED current but the LED current will only flow when the post diode bridge voltage exceeds the threshold voltage of LED string 235.

Figure 1:
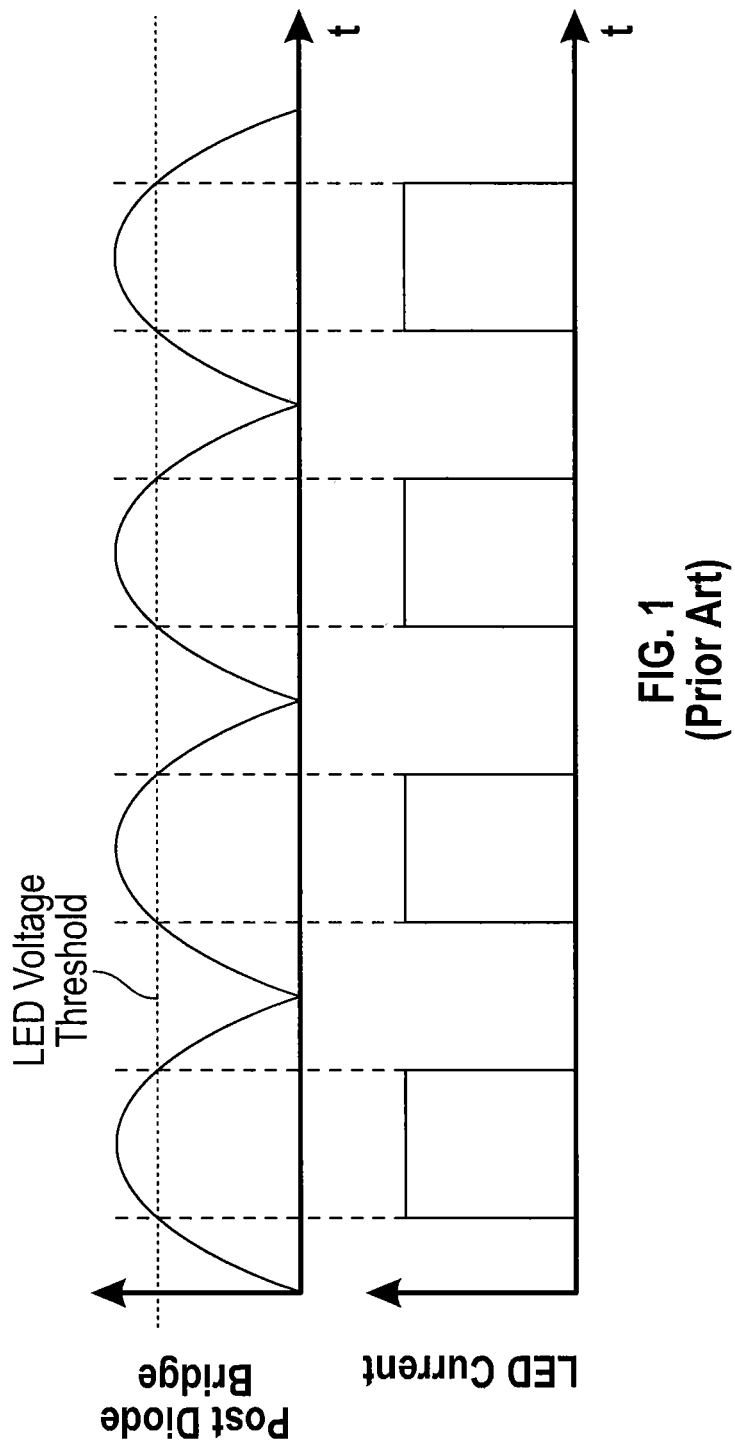
FIG. 1 illustrates a post diode bridge voltage waveform and an LED current waveform for a conventional direct AC LED lighting device.

In general, the threshold voltage of a single LED is relatively low such as between 1.8 and 3.3 V. The threshold voltage of a serial string of LEDs such as LED string 235 is thus a multiple of this single LED threshold voltage, with the multiple depending upon how many LEDs are used to form LED string 235. Referring back to FIG. 1, note that the maximum value for the post diode bridge voltage is relatively high due to it being formed from the rectification of the AC mains voltage. For example, the RMS value for the AC mains voltage in the US is 120 V so that the maximum voltage in each cycle of the post diode bridge voltage will be approximately 160 V. As seen in FIG. 1, an LED string is typically constructed with a sufficient number of LEDs such that the resulting threshold voltage is also rather high such as 100 V. In general, as the post diode bridge voltage rises higher and higher above the threshold voltage as also shown in FIG. 1, the energy from this excess voltage is lost as heat rather than being used to produce light. For this reason, it is conventional to construct an LED string so that its threshold voltage is relatively high such as 100 V.

Figure 3:
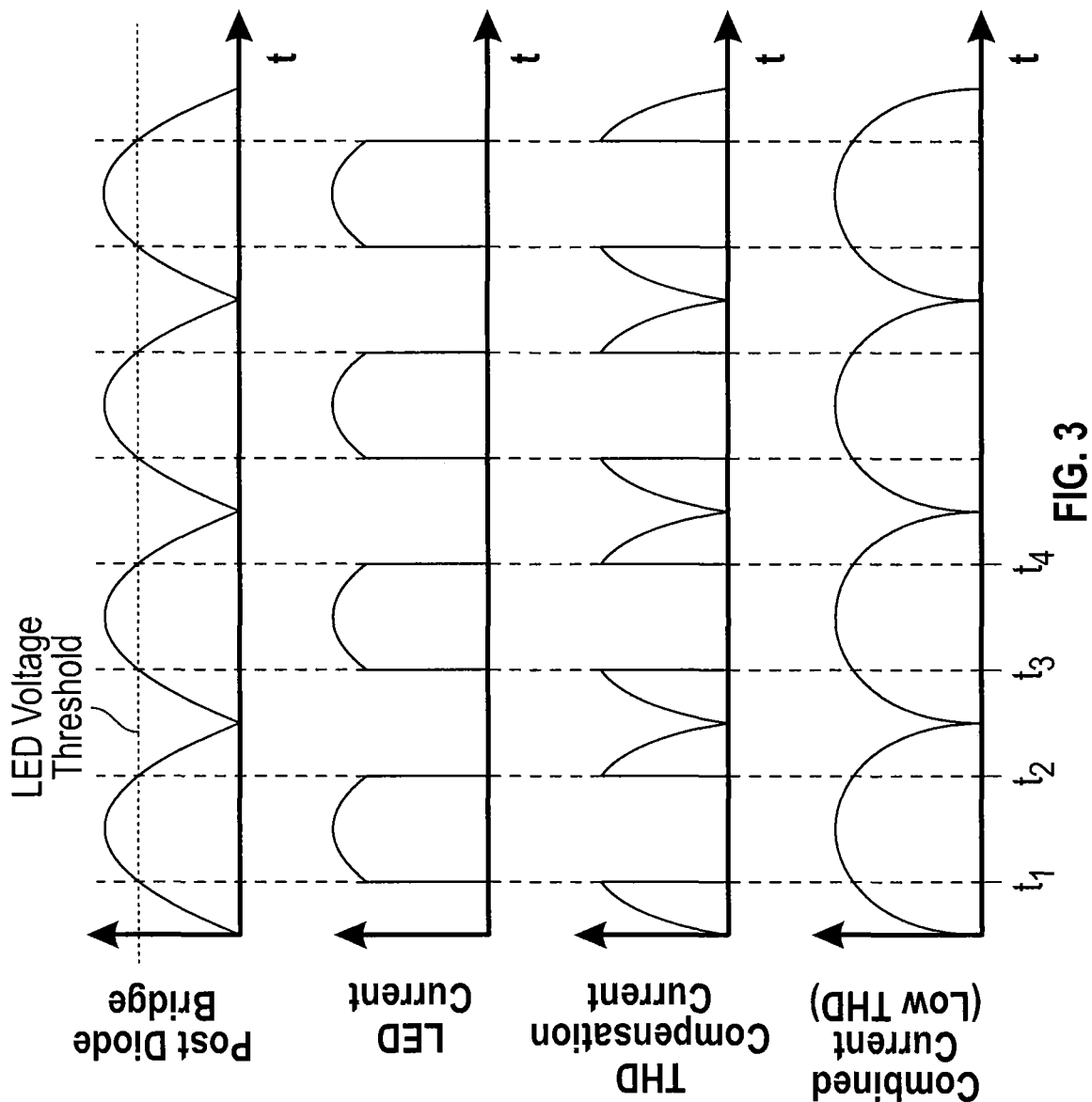
FIG. 3 illustrates a post diode bridge waveform, an LED current waveform, a THD compensation current waveform, and a combined current waveform for a direct AC lighting device in accordance with an aspect of the disclosure.

Regardless of the exact value for the threshold voltage for LED string 235, controller 220 will control variable current sources 225 and 230 so that the current drawn from power supply rail 215 is proportional to the post diode bridge voltage. The resulting current and voltage waveforms are shown in FIG. 3. For example, in a first cycle, the post diode bridge voltage rises above the threshold voltage at a time t1 so that the threshold voltage for LED string 235 is exceeded. Controller 220 responds by switching off variable current source 225 and controlling variable current source 230 to conduct an LED current that is proportional to the post diode bridge voltage. At a time t2, the post diode bridge voltage drops below the threshold voltage so that the LED current stops flowing through LED string 235. Controller 220 responds to the cessation of the LED current by controlling variable current source 225 to conduct a THD compensation current that is proportional to the post diode bridge voltage. Controller 220 continues to control variable current source 225 to conduct the THD compensation current until a time t3 for a subsequent cycle of the post diode bridge voltage as it rises above the threshold voltage. Controller 220 then switches off variable current source 225 and controls variable current source 230 to conduct the LED current again that is proportional to the post diode bridge voltage until a time t4 when the post diode bridge voltage sinks below the threshold voltage. In this fashion, the combined current (the sum of the THD compensation current and the LED current) that is sourced from power supply rail 215 is always proportional to the post diode bridge voltage to achieve a reduced THD and improved power factor.

Referring again to FIG. 2, controller 220 may sense the post diode bridge voltage through a voltage divider such as formed by a pair of resistors R. Controller 220 may also include an analog-to-digital converter (ADC) 245 for digitizing the sensed post diode bridge voltage into a digital command for controlling the currents conducted by variable current sources 225 and 230. The resulting digital command may continually drive variable current source 230 as variable current source 230 will only conduct when the threshold voltage for LED string 235 is exceeded. To determine whether the LED current has stopped flowing due to the post diode bridge voltage falling below the threshold voltage, controller 220 may include a comparator 240 that compares a voltage across a sense resistor RS to a relatively small positive reference voltage from a voltage source 260. Sense resistor R2 couples between ground and variable current source 230 so that the sense resistor voltage rises above ground when the LED current flows. An output signal from comparator 240 will thus go high in response to the post diode bridge falling below the threshold voltage for LED string 235 such that the LED current stops conducting. The high state for the comparator output signal closes a switch 51 that lets the digital command control variable current source 225. Variable current source 225 will thus conduct the THD compensation current only while the post diode bridge voltage is below the threshold voltage for LED string 235. Comparator 240 opens switch 51 when the LED current flows to prevent variable current source 225 from conducting while LED string 235 conducts. To respond to the digital command, variable current sources 225 and 230 may each comprise a current digital-to-analog converter (iDAC).

As compared to variable current source 225, variable current source 230 is protected from the high voltage on power supply rail 215 by the threshold voltage drop across LED string 235. To protect variable current source 225, it may couple to power supply rail 215 through a high-voltage MOSFET M1. Controller 220 controls transistor M1 to operate in the linear region so as to induce a sufficient voltage drop and protect variable current source 225 accordingly. For example, controller 220 may include a voltage source 255 for biasing the gate of transistor M1 with a bias voltage such as 15 V. As the post diode bridge voltage rises high above 15 V, transistor M1 is forced into the linear region of operation so that its drain voltage is significantly reduced as compared to the post diode bridge voltage to protect variable current source 225. Note that transistor M1, sense resistor Rs, and variable current sources 225 and 230 may be integrated within controller 220 so that they are shown separately in FIG. 2 for illustration clarity. Controller 220 itself may be integrated within a controller integrated circuit for direct AC LED lighting device 200. The voltage divider resistors R would typically be external to the integrated circuit forming controller 220.

Figure 4:
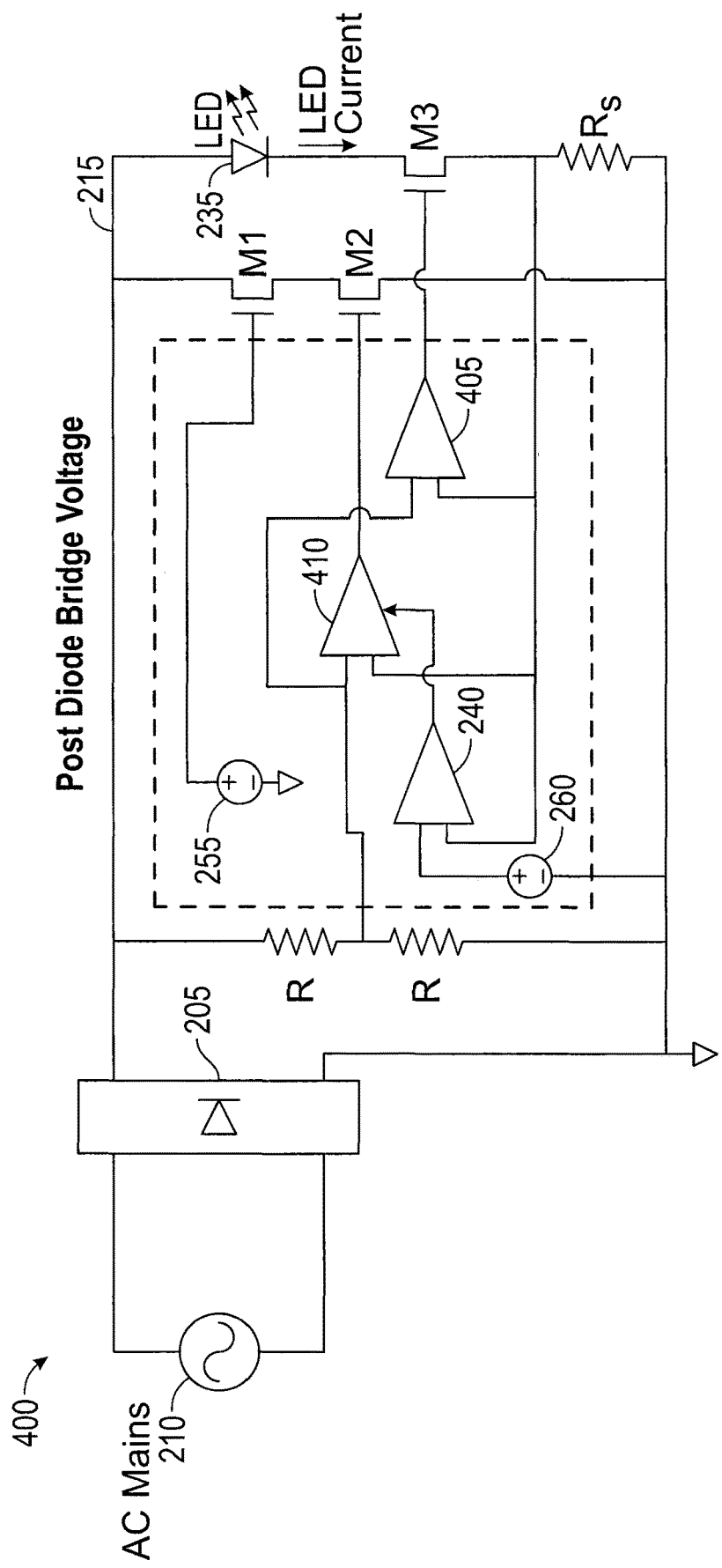
FIG. 4 illustrates a direct AC LED lighting device with analog control in accordance with an aspect of the disclosure.

An example direct AC lighting device 400 with analog control is shown in FIG. 4. The THD compensation variable current source comprises a MOSFET M2 having its gate voltage driven by an operational amplifier 410 responsive to a difference between the sense resistor voltage on sense resistor RS and the divided version of the post diode bridge voltage as received through the voltage divider formed by resistors R. Comparator 240 operates as discussed previously to compare the voltage across the sense resistor RS to a relatively small positive reference voltage from voltage source 260. An output signal from comparator 240 will thus go high in response to the post diode bridge voltage falling below the threshold voltage for LED string 235 such that the LED current stops conducting. The high state for the comparator output switches on operational amplifier 410 to drive the gate of transistor M2 so that the THD compensation current flows. When LED string 235 conducts, comparator 240 switches off operational amplifier 410 so that transistor M2 no longer conducts the THD compensation current.

The LED current is controlled by a variable current source transistor M3 coupled between LED string 235 and current sense resistor Rs. An operation amplifier 405 drives the gate of transistor M3 responsive to the difference between the sense resistor voltage and the sensed version of the post diode bridge voltage. When the post diode bridge voltage exceeds the threshold voltage for LED string 235, the LED current will thus be proportional to the post diode bridge voltage. Similarly, the THD compensation current conducted by the transistor M2 will also be proportional to the post diode bridge voltage to achieve high power factor and low THD.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A direct AC LED lighting device controller, comprising:
   a first variable current source for coupling between ground and a power rail supplying a post diode bridge voltage from a diode bridge for rectifying an AC mains voltage;
   a second variable current source for coupling in series with an LED string;
   a comparator configured to compare a sense resistor voltage for a sense resistor in series with the LED string to a reference voltage to determine whether the LED string conducts an LED current; and
   a control circuit for controlling the first variable current source to conduct a total harmonic distortion (THD) compensation current that is proportional to the post diode bridge voltage while an output signal from the comparator indicates that the LED current is not conducting and for controlling the second variable current source so that the LED current is proportional to the post diode bridge voltage while the post diode bridge voltage is greater than the reference voltage.

2. The direct AC LED lighting device controller of claim 1, wherein the control circuit comprises an analog-to-digital converter for digitizing a version of the post diode bridge voltage into a digital command, wherein the first variable current source and the second variable current source are each configured to conduct responsive to the digital command.

3. The direct AC LED lighting device controller of claim 2, wherein the first variable current source comprises a current digital-to-analog converter (iDAC).

4. The direct AC LED lighting device controller of claim 2, wherein the second variable current source comprises a current digital-to-analog converter (iDAC).

5. The direct AC LED lighting device controller of claim 2, wherein the first variable current source comprises a first current source transistor and wherein the second variable current source comprises a second current source transistor.

6. The direct AC LED lighting device controller of claim 1, wherein the direct AC LED lighting device controller comprises an integrated circuit.

7. The direct AC LED lighting device controller of claim 1, further comprising:
   a high-voltage metal-oxide-semiconductor-field-effect-transistor (MOSFET), wherein the high-voltage MOSFET is coupled between the power rail and the first variable current source.

8. The direct AC LED lighting device controller of claim 7, further comprising:
   a voltage source for biasing a gate of the high-voltage MOSFET with a bias voltage so that the high-voltage MOSFET operates in a linear region while the post diode bridge voltage is greater than the bias voltage.

9. The direct AC LED lighting device controller of claim 1, wherein the second variable current source is configured to couple between the LED string and ground.

10. A method, comprising:
    rectifying an AC mains voltage, via a diode bridge, to produce a post diode bridge voltage;
    in response to the post diode bridge voltage being greater than a threshold voltage for an LED, controlling a first variable current source in series, via a control circuit, with the LED to conduct an LED current for the LED that is proportional to the post diode bridge voltage; and
    controlling a second variable current source, via the control circuit, to conduct a total harmonic distortion (THD) compensation current that is proportional to the post diode bridge voltage while the LED does not conduct the LED current in response to the post diode bridge voltage being less than the threshold voltage.

11. The method of claim 10, wherein the LED current for the LED is an LED current for an LED string.

12. The method of claim 10, further comprising:
    dividing down the post diode bridge voltage to form a divided version of the post diode bridge voltage; and
    digitizing the divided version of the post diode bridge voltage to form a digital command, wherein controlling the first variable current source and the second variable current source comprises commanding the first variable current source and the second variable current source with the digital command.

13. The method of claim 12, wherein commanding the first variable current source with the digital command comprises commanding a current digital-to-analog-converter (iDAC) with the digital command.

14. The method of claim 13, further comprising coupling the iDAC through a high-voltage MOSFET to a power rail supplying the post diode bridge voltage while biasing a gate of the high-voltage MOSFET to operate in a linear region of operation.

15. The method of claim 12, wherein commanding the second variable current source with the digital command comprises commanding a current digital-to-analog-converter (iDAC) with the digital command.

\* \* \* \* \*